A. A. PAULY.
MOLDING APPARATUS.
APPLICATION FILED NOV. 18, 1915. RENEWED JAN. 16, 1918.
1,320,705.
Patented Nov. 4, 1919.
2 SHEETS—SHEET 1.
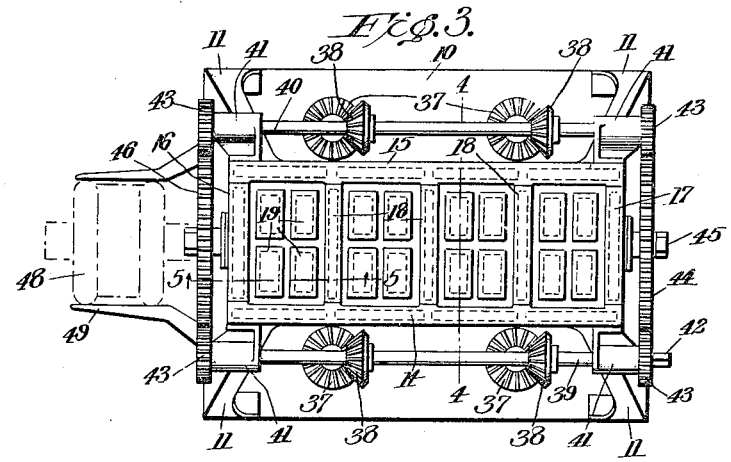
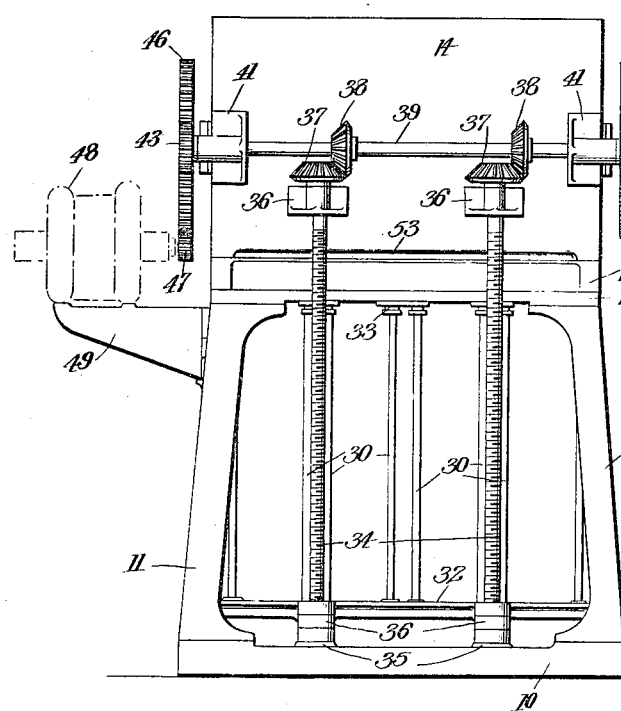
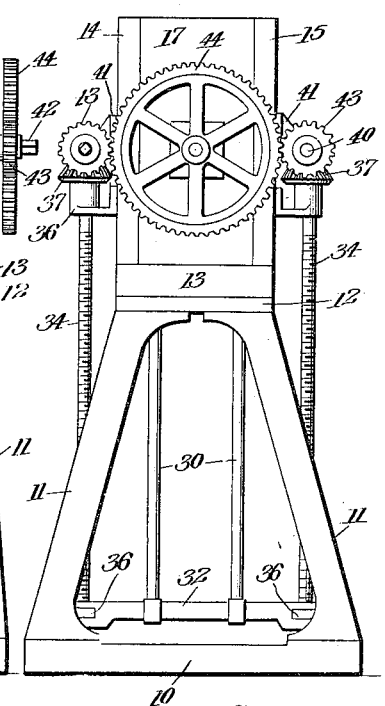

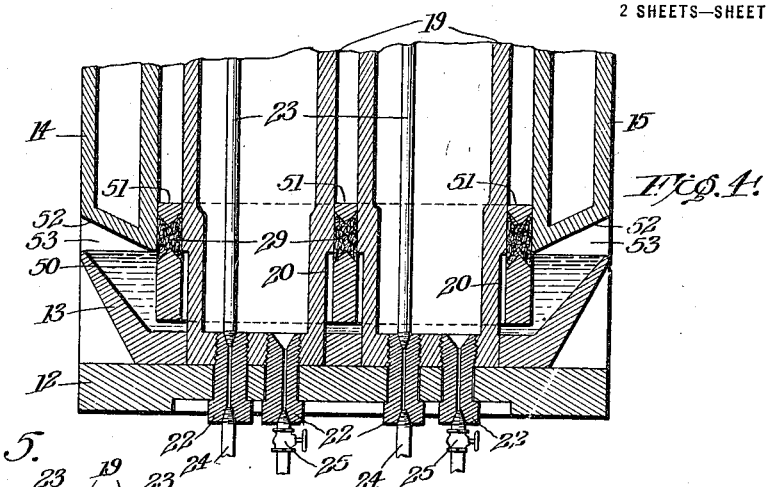
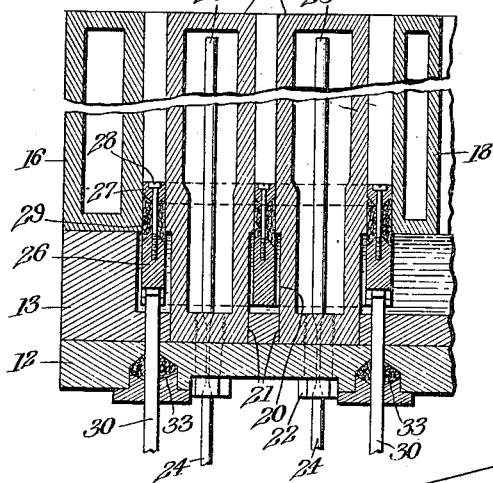
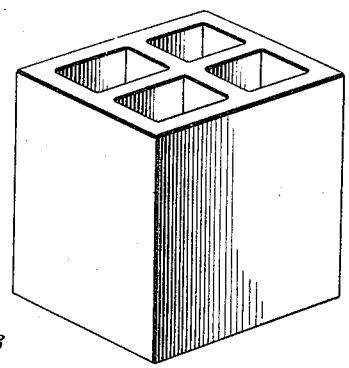
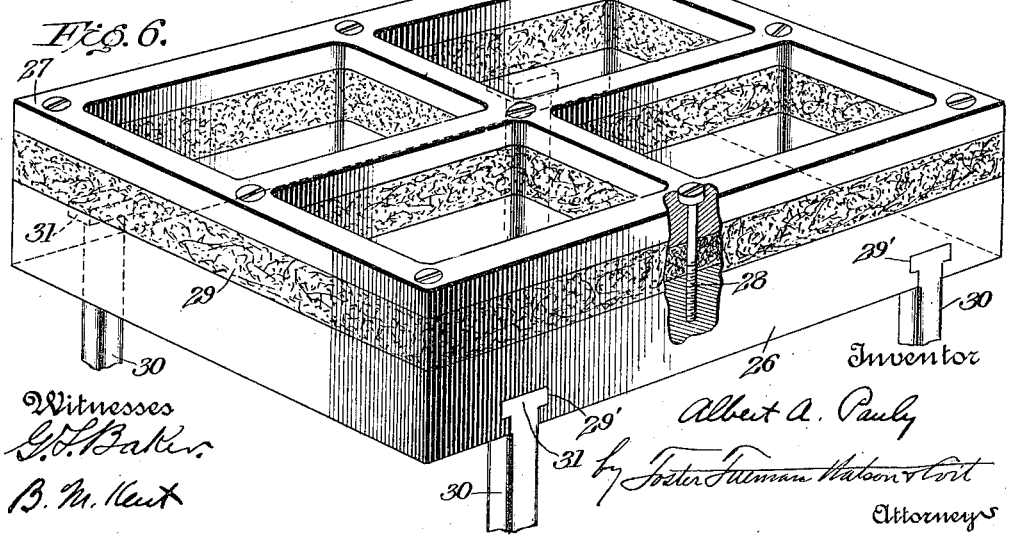

UNITED STATES PATENT OFFICE.

ALBERT A. PAULY, OF CLEVELAND, OHIO.

MOLDING APPARATUS.

1,320,705. Specification of Letters Patent. Patented Nov. 4, 1919.

Original application filed March 27, 1915, Serial No. 17,457. Divided and this application filed November 18, 1915, Serial No. 62,188. Renewed January 16, 1918. Serial No. 212,153.

*To all whom it may concern:*

Be it known that I, ALBERT A. PAULY, a citizen of the United States, residing at Cleveland, in the county of Cuyahoga and State of Ohio, have invented certain new and useful Improvements in Molding Apparatus, of which the following is a specification.

This invention relates to apparatus for molding hollow tile, brick, and other articles from Portland cement, or its equivalent, in combination with ashes, sand or other suitable material, or from gypsum or plaster. The present application is a division of my earlier application Serial No. 17,457, filed March 27, 1915.

One of the objects of the invention is to provide an improved form of apparatus for the purpose specified whereby the articles may be produced in the most expeditious manner and at a minimum cost. A further object of the invention is to provide a molding machine with suitable means for lubricating the mold surfaces and so that the articles will have a smooth surface and may be ejected from the molds without difficulty.

In making articles of concrete or other cementitious material one of the principal items of expense is in connection with the handling of the articles, not only because of the direct cost of handling but also because of the breakage which necessarily results from inefficient methods of handling. In accordance with the present invention I have provided highly efficient means for ejecting the articles from the molds so as to have an extremely low cost and the minimum amount of breakage.

With the foregoing and other objects in view, as will appear from the following description, the invention may be embodied in various forms of apparatus, one of which is illustrated in the accompanying drawings.

In these drawings:

Figure 1 is a side elevation of a molding machine;

Fig. 2 is an end elevation;

Fig. 3 is a plan;

Fig. 4 is a section on the line 4—4 of Fig. 3;

Fig. 5 is a section on the line 5—5 of Fig. 3;

Fig. 6 is a perspective view of the mold plunger;

Fig. 7 is a perspective view of a tile such as is molded in the machine illustrated.

In accordance with the present invention the concrete or other material from which the articles are to be made, is poured into the molds in liquid form and allowed to remain there from two to three minutes. The molds are heated, as will be hereinafter described, and the heat causes the articles to set sufficiently, in from two to three minutes, to permit of their being ejected from the molds. The articles, in the form of the invention illustrated, are forced vertically out of the molds into a skeleton transporting form which is fully described and claimed in my aforesaid earlier application.

Referring to the drawings, 10 indicates a base plate on which are secured legs 11, these legs supporting a plate 12 on which there is a trough-shaped bed 13. The side walls 14 and 15 of the mold are supported on the bed 13 and coöperate with the end walls 16 and 17 and the partitions 18 to form a plurality of chambers in which the articles are cast. As shown in Fig. 3, the casting machine contains four of these chambers and in each chamber there are four core members 19 which are spaced from the walls of the chamber and from each other to form the molds for making tiles such as illustrated in Fig. 7. It will be seen that this tile is a hollow rectangular structure provided with right angularly arranged partitions or reinforcing webs. The cores 19 have their lower ends reduced in size as indicated at 20 and project through openings 21 in the bed 13. The cores are secured in position by means of bolts 22 which project through the plate 12 and have screw-thread connections with the core members, as clearly shown in Figs. 4 and 5. The core members are hollow and the bolts 22 have longitudinal passages therein. One of the bolts 22, connected with each of the core members, has secured to the upper end thereof a pipe 23 which is open at its upper end and is adapted to convey steam to the upper part of the core, the steam being supplied by a pipe 24. The other bolt, 22, of each of the cores has secured thereto a drain pipe which may be provided with a control valve indicated at 25. The side walls 14 and 15 and the end walls 16 and 17 are hollow and may be supplied with steam in any suitable manner. The partitions 18 are also hollow and supplied with steam so that all of the walls of the mold are heated to the proper temperature.

Arranged in each of the chambers of the mold is a plunger which is shown in detail in Fig. 6. These plungers comprise a main body 26 in the form of a grid and a grid plate 27 of the same shape and secured to the body 26 by a plurality of screws 28. Between the body 26 and the plate 27 there is arranged packing material 29, this packing material being preferably of a fibrous nature which is adapted to absorb a lubricating oil. Each of the plungers is provided with four symmetrically arranged T slots 29′ on the lower side thereof, and oval plunger rods 30 having T heads 31 fitting slots 29′, project through the bottom wall of the bed 13 and through the plate 12 and are connected at their lower ends with a cross head 32. Stuffing boxes 33 are arranged on the under side of the plate 12 and prevent leakage of oil downwardly along the rods 30, from the bed 13. The cross head 32 is raised and lowered by means of four screw-threaded shafts 34, arranged in pairs on opposite sides of the machine and having their lower ends supported in bearings 35. The cross head 32 carries nuts 36 which coöperate with the threaded shafts 34 so that when the shafts are rotated the cross head will be raised or lowered in accordance with the direction of rotation of the shafts. For the purpose of rotating the shafts they are provided at their upper ends with bevel gears 37 and these gears are rotated by gears 38 arranged on shafts 39 and 40 on opposite sides of the machine. The shafts 39 and 40 are supported in bearings 41 and the shaft 39 is provided with a squared end 42 adapted to receive a crank whereby it may be rotated manually. The shafts 39 and 40 are provided at their opposite ends with pinions 43, the pinions at one end of the machine meshing with a gear 44 which is rotatably mounted on a stub shaft 45 and the pinions 43 at the opposite end of the machine mesh with a gear 46 which is suitably supported and preferably driven by a pinion 47 on the shaft of a motor 48, this motor being shown diagrammatically on a suitable bracket 49 therefor.

The system of gearing just described is adapted to effect the simultaneous rotation of all of the shafts 34 either by the motor 48 or by means of a crank attached to the shaft 39. In this way all parts of the cross head 32 will be given a uniform movement and this uniform movement will be transmitted to all of the plungers in the casting chambers, by means of the rods 30.

Referring to Fig. 4 it will be seen that the bed 13 is trough-shaped and adapted to contain a body of lubricating oil which is indicated at 50. In this figure the parts of one of the plungers are indicated at 51 and the level of the oil in the bed 13 is maintained at a sufficient height to permit the packing 29 of the plunger to dip into it when the plunger is in its lowest position. The packing thus absorbs some of the oil, which is conveyed upwardly through the packing in much the same manner that oil ascends a lamp wick. In order to provide means for supplying oil to the reservoir, in the bed 13, the side walls 14 and 15 have their lower portions beveled as indicated at 52 thereby forming, with the upper edge of the bed, slots 53 as shown in Figs. 1 and 4. These slots are also employed for the purpose of cleaning out the oil reservoir and permit a steam jet or other agency to be employed for this purpose.

In the operation of the molding machine the four casting chambers or molds are filled above the plungers with the liquid concrete material and, on account of the walls of the chambers being heated, the concrete quickly sets and after a lapse of from two to three minutes the articles are sufficiently hard to permit of their being ejected from the molds. When it is desired to eject the articles the shafts 34 are operated, either by the motor 48 or a crank, as above described, and the plungers are moved upwardly. The plunger packing wipes over the surfaces of the mold and thus lubricates these surfaces so that when the next batch of concrete material is run into the molds the oil on the surfaces will prevent the concrete from adhering. In this way it is possible to produce articles having smooth exterior surfaces and the lubrication of the mold surfaces also facilitates the ejection of the articles. The normal position of the plunger is at the bottom of the mold as indicated in Figs. 4 and 5 and while the concrete material is being run into the molds and being allowed to set there is time for the packing material to absorb the requisite amount of lubricant for lubricating the mold surfaces upon the next reciprocation of the plunger. By reducing the size of the lower ends of the cores, as indicated at 20, oil spaces are provided around the plunger so that the oil will have access to all parts of the packing. The packing material also serves to clean the surfaces of the mold and in this way improves the quality of the articles produced.

The packing will be subjected to wear on account of wiping over the mold surfaces upon each reciprocation of the plunger and it therefore is necessary to renew the packing at intervals and in order to permit the renewal of the packing without delaying the operation of the machine materially I have provided means whereby the plungers may be readily detached from their actuating rods 30. From Fig. 6 it will be seen that the plungers are connected with the actuating rods by coöperating T heads and slots which will permit the plungers to be withdrawn from the rods by a lateral movement when the plungers are projected beyond the upper edges of the molds. One or more extra plungers will be preferably provided with the apparatus and when one of the plungers is removed an extra plunger, on which the packing material has been previously renewed, will be substituted, and thus the operation of the machine may proceed without it being necessary to delay the operation until the packing material of the plunger is renewed. It will be understood that other forms of connection may be provided between the rods 30 and the plungers which will serve the same purpose as the T heads 31 in permitting the plungers to be readily detached from their actuating rods.

The sections of the plunger may be adjusted to give different depths of plunger by varying the thickness of the packing 29 and adjusting the screws 28, thus providing for molding materials of different degrees of compressibility so as to produce articles of uniform length.

While I have shown what I now consider to be the preferred form of my invention, it will be understood that the invention is not limited to this form and that various changes may be made in the details of construction and arrangement of the parts without departing from the spirit of the invention as defined in the appended claims.

Having thus described the invention, what is claimed and desired to be secured by Letters Patent is:

1. In apparatus of the class described, the combination of a mold, an ejecting plunger arranged in said mold and provided with packing material adapted to wipe over the surfaces of the mold when the plunger is reciprocated, and means for automatically supplying lubricant to said packing material.

2. In apparatus of the class described, the combination of an open-top mold, an ejecting plunger arranged in said mold and provided with packing material adapted to wipe over the surfaces of the mold upon each reciprocation of the plunger, and an oil reservoir arranged below the plunger and into which the latter moves at the end of each reciprocation.

3. In apparatus of the class described, the combination of an open-top mold, a plunger arranged therein and provided with a packing material adapted to wipe over the surfaces of the mold when the plunger is reciprocated, an oil reservoir arranged below said mold and in which the plunger is normally arranged when at rest, and means whereby oil is supplied to said reservoir.

4. In apparatus of the class described, the combination of a mold, an ejecting plunger arranged in said mold, and an oil reservoir arranged below said mold, the parts being so constructed and arranged as to provide one or more openings at the top of the resvoir through which oil may be supplied thereto.

5. In apparatus of the class described, the combination of a mold, an ejecting plunger arranged therein, an oil reservoir arranged below the mold for lubricating the plunger, one or more actuating rods for the plunger extending through the bottom wall of said reservoir, and packing means surrounding said rods to prevent leakage from said reservoir.

6. In apparatus of the class described, the combination of a base plate arranged to contain oil, walls carried by said base plate and forming a mold, there being provided spaces between the bottoms of said walls and said base plate to permit access to the oil containing space, and a plunger fitting the interior of said walls and adapted to descend into said oil space.

7. In apparatus of the class described, the combination of a trough-shaped base plate adapted to act as an oil reservoir, side walls supported on said base plate, there being provided at their lower edges slits permitting access to the oil reservoir, and cores secured to said base plate and projecting upwardly within said walls.

8. In apparatus of the class described, the combination of a mold, a plunger arranged in said mold, a plurality of rods having heads engaging slots in said plunger, and means for simultaneously actuating said rods, said heads and slots being arranged to permit the plunger to be withdrawn laterally from engagement with said rods when the plunger is projected beyond said mold.

9. In apparatus of the class described, the combination of a mold, a plunger arranged in said mold, a plurality of rods connected at one end with said plunger, a crosshead with which said rods are connected and from which they are actuated, an oil reservoir between the mold and cross head and through which said rods extend, and means for positively moving said crosshead in either direction.

10. In apparatus of the class described, the combination of a mold, a plunger arranged in said mold, a plurality of rods connected at one end with said plunger, a crosshead with which said rods are connected and from which they are actuated, an oil reservoir between the mold and cross head and through which said rods extend, a plurality of screws operatively connected with said crosshead, and power means for positively rotating said screws in either direction and simultaneously.

11. In apparatus of the class described, the combination of a mold, a sectional plunger arranged in said mold, packing means between said sections, and adjustable means connecting said sections together and permitting the depth of the plunger to be varied to suit the degree of compressibility of the molded material.

In testimony whereof I affix my signature.

ALBERT A. PAULY.

Copies of this patent may be obtained for five cents each, by addressing the "Commissioner of Patents, Washington, D. C."